United States Patent Office.

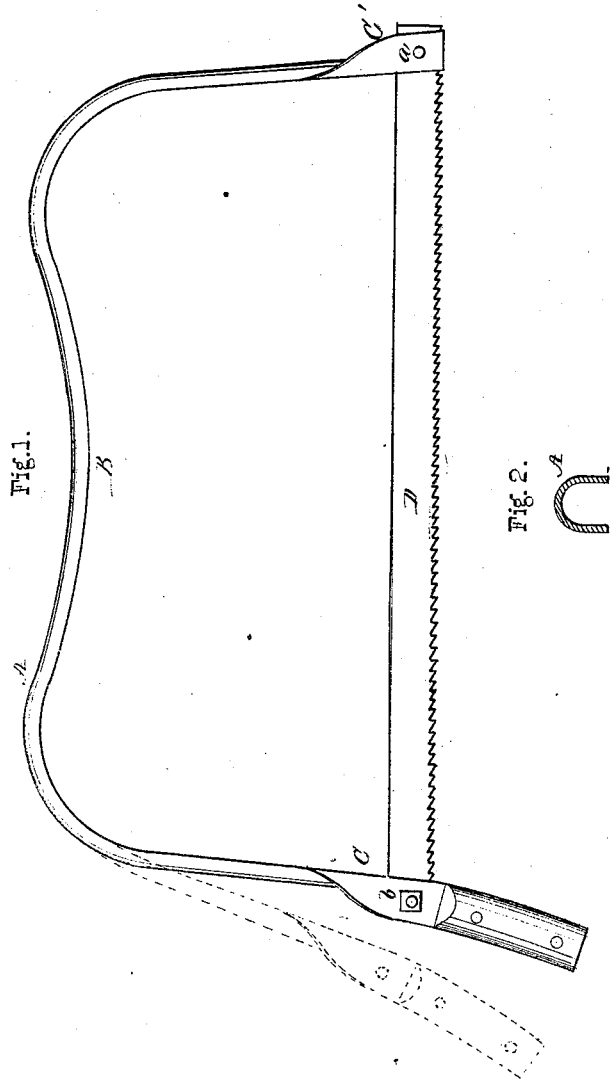

EMANUEL ANDREWS, OF WILLIAMSPORT, PENNSYLVANIA.

Letters Patent No. 103,700, dated May 31, 1870.

IMPROVEMENT IN SAW-FRAME.

The Schedule referred to in these Letters Patent and making part of the same

*To all whom it may concern:*

Be it known that I, EMANUEL ANDREWS, of Williamsport, in the county of Lycoming and in the State of Pennsylvania, have invented certain new and useful Improvements in Saw-Frames; and do hereby declare that the following is a full, clear, and exact description thereof, reference being had to the accompanying drawing, with letters of reference marked thereon, in which—

Figure 1 is a side elevation of the saw frame, with a saw in position, the portion in dotted lines showing the position of the frame when the saw is detached; and Figure 2 is a vertical cross-section of the frame, showing its ∩-shaped form of construction.

The nature of this invention relates to an improvement in the frames of saws for wood, meats, metal, or for any other appropriate use; and The purpose of the invention is the making of a frame of elastic steel, which shall, by its continuous outward spring, keep the saw properly strained without the use of braces or of any straining apparatus, which shall be cheap and simple in construction, of little weight, durable, and convenient, and which shall not be liable to the objections attending the use of frames of wood and of cast metal.

The invention consists in a frame of elastic plate steel, of the shape of an inverted U, bent into the form of an arch, with a depression in the crown, the outward spring of which frame keeps the saw properly strained at all times, without the use of any sort of brace or straining apparatus, the ends of which frame are turned so as to bring the width of the plate in a line with the direction of a saw, so that the same may be conveniently secured thereto.

In the drawing—

A represents the frame, constructed of plate steel, and bent in the form above described, with a depression, B, in the crown or top center thereof.

One end, C, of the frame extends a sufficient distance below the saw D, and forms the center of the handle. The other end, C', extends only as far as the lower edge of the saw.

Each of these ends C and C' is made by twisting the frame so as to bring the width of the plate of which it is constructed in line with the saw, so that it may fit closely thereto, and be readily secured to each end of it.

Upon the end C wooden or other suitable handles are secured in any ordinary manner.

One end of the saw is secured to the end C' of the frame by an ordinary rivet, *a*, or by any convenient method, and the other end of the saw is secured to the end C of the frame by a screw and nut, *b*, or by any other convenient detachable device.

I have found, in practice, that a steel plate one inch wide and three-sixteenths of an inch thick, is the most suitable size for a frame for a saw for cutting firewood; but this size, of course, would differ with the use for which the saw was intended.

I have also found, by experiment, that bending the frame equally at all parts above the saw into the shape of the letter U reversed, with the opening downward, as shown in fig. 2, gives the strongest spring with the least weight of metal.

I have also determined, by experiment, that the depression B, in the crown of the frame, serves a beneficial purpose in giving to said frame a longitudinal stiffness, and in resisting the tendency of the same to spring inward when the saw bends, or meets with great resistance in cutting.

I do not wish, however, to be confined to the specific arch-form of the frame, nor to the ∩-shaped vertical section thereof, but desire to use any substantially similar form of the frame or sectional shape which will produce substantially the same beneficial results.

The method of operating this frame and saw is too obvious to need particular mention.

The benefits of the improvement may be comprised in the lightness of the frame, which is not heavier than one of wood, its cheapness of construction, which is apparent, its simplicity, which is evident upon inspection, its durability, and its efficiency.

It has an advantage over wood frames, that it is not affected injuriously by moisture or heat, does not warp or shrink, or sensibly lose its elasticity. It has an advantage over cast metal frames, in that it is lighter, is elastic, and does not require additional straining apparatus.

Having thus fully set forth the nature, purpose, and merits of my improvement,

What I claim as my invention and desire to secure by Letters Patent, is—

A saw-frame, constructed of spring steel, substantially as described and shown and for the purpose set forth.

In testimony that I claim the foregoing, I have hereunto set my hand this 16th day of April, 1870.

EMANUEL ANDREWS.

Witnesses:
JOSEPH ANDREWS,
JAS. MUNROE.